United States Patent
Beisele et al.

(10) Patent No.: US 10,696,820 B2
(45) Date of Patent: Jun. 30, 2020

(54) THERMOSETTING RESIN COMPOSITION FOR THE PREPARATION OF OUTDOOR ARTICLES AND THE ARTICLES OBTAINED THEREFROM

(71) Applicant: HUNTSMAN ADVANCED MATERIALS LICENSING (SWITZERLAND) GMBH, Basel (CH)

(72) Inventors: Christian Beisele, Müllheim (DE); Zhijian Liu, Shanghai (CN); Hongyan Chen, Shanghai (CN); Satoru Hishikawa, Osaka (JP)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 0 days.

(21) Appl. No.: 15/561,893

(22) PCT Filed: Mar. 10, 2016

(86) PCT No.: PCT/EP2016/055162
§ 371 (c)(1),
(2) Date: Sep. 26, 2017

(87) PCT Pub. No.: WO2016/150724
PCT Pub. Date: Sep. 29, 2016

(65) Prior Publication Data
US 2018/0118922 A1  May 3, 2018

(51) Int. Cl.
| | |
|---|---|
| C08G 59/40 | (2006.01) |
| C08G 59/24 | (2006.01) |
| C08G 59/32 | (2006.01) |
| C08G 59/50 | (2006.01) |
| C08L 63/00 | (2006.01) |
| C08K 9/00 | (2006.01) |
| C08K 9/06 | (2006.01) |
| C08K 3/36 | (2006.01) |
| B32B 27/20 | (2006.01) |
| B32B 27/26 | (2006.01) |
| B32B 27/38 | (2006.01) |

(52) U.S. Cl.
CPC ............ *C08K 9/06* (2013.01); *C08G 59/24* (2013.01); *C08G 59/4021* (2013.01); *C08G 59/5006* (2013.01); *C08G 59/5026* (2013.01); *C08K 3/36* (2013.01)

(58) Field of Classification Search
CPC .. C08K 9/00; C08K 9/06; C08L 63/00; C08G 59/24; C08G 59/3218; C08G 59/4021; C08G 59/5006; C08G 59/502; C08G 59/5026; B32B 27/20; B32B 27/26; B32B 27/38

USPC ............ 428/413; 523/427, 428, 457, 466
See application file for complete search history.

(56) References Cited

U.S. PATENT DOCUMENTS

| | | | |
|---|---|---|---|
| 3,210,375 A | 10/1965 | Porret et al. | |
| 3,425,961 A | 2/1969 | Jellinek et al. | |
| 3,470,129 A * | 9/1969 | Batzer ............... | C08G 59/4021 523/461 |
| 5,393,805 A * | 2/1995 | Koyama ............... | C08G 59/18 428/413 |
| 5,508,328 A * | 4/1996 | Olson ................. | C08G 59/18 523/445 |
| 5,668,227 A | 9/1997 | Wolleb et al. | |
| 2010/0319964 A1 * | 12/2010 | Ootake ............... | C08L 63/00 174/137 B |
| 2012/0202918 A1 * | 8/2012 | Singh ................. | C08G 59/4284 523/200 |
| 2018/0371153 A1 * | 12/2018 | Beisele .............. | C08G 59/226 |

FOREIGN PATENT DOCUMENTS

| | | |
|---|---|---|
| CA | 2164915 A1 | 6/1996 |
| EP | 0597806 A1 | 5/1994 |
| EP | 717073 A2 | 6/1996 |
| GB | 870696 A | 6/1961 |
| GB | 1144638 A | 3/1969 |
| GB | 2147225 A | 5/1985 |
| WO | 2009062543 A1 | 5/2009 |

OTHER PUBLICATIONS

International Search Report and the Written Opinion of the International Searching Authority dated Jun. 1, 2016, in the prosecution of International application No. PCT/EP2016/055162, 10 pages.

* cited by examiner

*Primary Examiner* — Michael J Feely
(74) *Attorney, Agent, or Firm* — Huntsman International LLC; Lewis Craft

(57) ABSTRACT

A multiple component thermosetting epoxy resin composition comprising
(A) at least one cycloaliphatic glycidyl-type epoxy resin without an ester group,
(B) at least one curing agent selected from the group aliphatic amine, cycloaliphatic amine, and dicyandiamide, and
(C) at least one silanized filler,
which, in particular, is suitable for the manufacture of outdoor insulation system articles for electrical engineering by casting, potting, encapsulation, and impregnation processes, wherein said articles exhibit good mechanical, electrical and dielectrical properties, and can be used as insulators, bushings, switchgears and instrument transformers.

13 Claims, No Drawings

THERMOSETTING RESIN COMPOSITION FOR THE PREPARATION OF OUTDOOR ARTICLES AND THE ARTICLES OBTAINED THEREFROM

CROSS-REFERENCE TO RELATED APPLICATIONS

This application is the National Phase of International Application PCT/EP2016/055162 filed Mar. 10, 2016 which designated the U.S. and which claims priority to application Ser. No. PCT/CN2015/075085 filed Mar. 26, 2015. The noted applications are incorporated herein by reference.

FIELD OF INVENTION

The present invention relates to a multiple component thermosetting epoxy resin composition, a process for the preparation of outdoor articles, such as insulation systems for electrical engineering, wherein the epoxy resin composition is used, and the articles obtained by the said process. The insulation encased articles obtained are suitable for electrical outdoor applications, exhibit good mechanical, electrical and dielectrical properties and can be used as, for example, insulators, bushings, switchgears and instrument transformers.

BACKGROUND OF THE INVENTION

Epoxy resin compositions are commonly used for the preparation of insulation systems for electrical engineering. However, most of these epoxy resin compositions utilize anhydrides as curing agents. Due to the developing regulatory framework for chemicals, it is expected that the use of anhydrides in epoxy resins will be restricted in the near future, because of their R42 label (respiratory sensitizer). Therefore, some anhydrides are already on the SVHC candidate list (substances of very high concern) of the REACH regulation. Therefore, it is likely that in some years these substances may no longer be used without special authorisation. As methyl hexahydrophthalic anhydride (MHHPA) and hexahydrophthalic anhydride (HHPA) are widely used as the main curing agents for cycloaliphatic outdoor epoxy resins for electrical insulation applications, there is a future need for alternative solutions that are not regarded as SVHC. As all known anhydrides are R42-labeled and even yet unknown anhydrides would be expected by toxicologists to be also R42-labeled, a solution that is free of anhydrides is desirable.

Amines as curing agents for epoxy resins are well known, in particular, for the preparation of composite materials. However, amine curing agents are often too reactive to be processable in electrical potting or encapsulation applications. As the mass of the epoxy resin composition to be processed increases, control of the exotherm becomes vital. The uncontrolled release of heat from the curing of the thermoset due to its mass may result in the degradation of the thermoset's mechanical properties, or even to thermal decomposition of the thermoset. Also degradation of the mechanical properties of the structural parts in contact with the thermoset is likely to occur. In particular in automatic pressure gelation process (APG), it is important to provide for a lower exothermic peak temperature to control the cure profile, i.e. gelation front within the mold. The cure profile of epoxy resin compositions is inappropriate and the exotherm is too high for application in APG, when amines are used as curing agents.

In order to cope with the problem of an inappropriate cure profile of epoxy resins containing amine curing agents, the use of aromatic amines was suggested. However, today the aromatic amines considered are on the banned substance list which prevents their use in potting or casting applications. As indicated above, other amines, such as aliphatic amines, are too reactive and do not provide an acceptable gelation profile in APG, which is suitable for the casting of big parts with low shrinkage and low exotherm. Moreover, some properties of the cured products are not competitive with anhydride cured thermosets, such as long term aging, tracking resistance, arc resistance, dielectric properties after humid conditioning. Accordingly, there is a need for new thermosetting, anhydride-free epoxy compositions which advantageously can be used in potting or encapsulation applications for manufacturing of electrical insulation systems, such as switchgear or transformer applications, suitable for outdoor applications.

It is an object of the present invention to provide a multiple component, anhydride-free thermosetting epoxy resin composition which is suitable for the preparation of articles exposed to outdoor conditions, such as outdoor insulation systems for electrical engineering. The epoxy resin composition shall be R42-free and SVHC-free, and distinguished by a low water pick-up, a very good water diffusion break down strength and a long pot life. The epoxy resin composition shall be suitable for processing by automatic pressure gelation (APG). It is desirable that the cure profile can be controlled in the desired manner. Still another object of the present invention is to provide the encased articles obtained from potting or encapsulation process which exhibit good mechanical, electrical and dielectrical properties, and can be used in outdoor applications, for example, as insulators, bushings, switchgears and instrument transformers in electrical engineering.

DETAILED DESCRIPTION

Accordingly, the present invention relates to a multiple component thermosetting epoxy resin composition comprising
(A) at least one cycloaliphatic glycidyl-type epoxy resin without an ester group,
(B) at least one curing agent selected from the group aliphatic amine, cycloaliphatic amine, and dicyandiamide, and
(C) at least one silanized filler.

The at least one cycloaliphatic glycidyl-type epoxy resin (A) does not contain an ester group, and is a compound containing at least one vicinal epoxy group, preferably more than one vicinal epoxy group, for example, two or three vicinal epoxy groups. The epoxy resin may be a monomeric or polymeric compound. Epoxy resins useful as component (A) are described, for example, in GB-A-1144638, U.S. Pat. No. 3,425,961, and Lee, H. and Neville, Handbook of Epoxy Resins, McGraw-Hill Book Company, New York (1982).

The epoxy resins used in embodiments disclosed herein for component (A) of the present invention may vary and include conventional and commercially available epoxy resins, which may be used alone or in combinations of two or more. In choosing epoxy resins for the compositions disclosed herein, consideration should not only be given to properties of the final product, but also to viscosity and other properties that may influence the processing of the resin composition. Suitable epoxy resins are free of ester groups, such as carboxylic ester groups. For example, the diglycidyl ester of a cycloaliphatic dicarboxylic acid, such as diglycidyl hexahydrophthalate is not suitable for the purpose of the present invention.

Particularly suitable epoxy resins known to the skilled worker are based on reaction products of polyfunctional cycloaliphatic alcohols, or polyfunctional aliphatic alcohols containing cycloaliphatic groups with epichlorohydrin.

Polyfunctional cycloaliphatic alcohols or polyfunctional aliphatic alcohols containing cycloaliphatic groups which come into consideration for reaction with epichlorhydrin to form suitable polyglycidyl ethers are, for example, 1,2-cyclohexanediol, 1,3-cyclohexanediol, 1,4-cyclohexanediol (quinitol), 1,4-bis(hydroxymethyl)cyclohexane, 1,1-bis(hydroxymethyl)cyclohex-3-ene, bis(4-hydroxycyclohexyl) methane (hydrogenated bisphenol F), 2,2-bis(4-hydroxycyclohexyl)propane (hydrogenated bisphenol A), 2,2-bis(3-methyl-4-hydroxycyclohexyl)propane (hydrogenated bisphenol C), 1,1-bis(4-hydroxycyclohexyl)ethane (hydrogenated bisphenol E), 1,3-cyclopentanediol, 4,4'-dihydroxydicyclohexane, 2,6-bis(4'-hydroxycyclohexylmethyl)-1-hydroxycyclohexane, 1,3,5-trihydroxycyclohexane, 1,2,2-tris (4-hydroxycyclohexyl)ethane, hydrogenated phenolformaldehyde condensation products having 3 to 10 cyclohexane rings.

In a preferred embodiment of the present invention the at least one epoxy resin (A) is a diglycidylether of 1,4-bis (hydroxymethyl)cyclohexane or hydrogenated bisphenol A. Especially, the at least one epoxy resin (A) is a diglycidylether of hydrogenated bisphenol A The epoxy equivalent of the at least one cycloaliphatic glycidyl-type epoxy resin (A) without an ester group is, for example, of from 4.0 to 5.5 Eq/kg, preferably of from 4.3 to 5.2 Eq/kg.

The at least one epoxy resin component (A) is either commercially available or can be prepared according to processes known per se. Such processes are described, for example, in GB-A-1144638 (Epoxide resins A, B C, D and F) and U.S. Pat. No. 3,425,961 (Examples 1, 2 and 6). Commercially available products are, for example, DY-C, a low viscous cycloaliphatic glycidyl-type epoxy resin available from Huntsman Corporation; EP4080E, a low viscous hydrogenated bisphenol A epoxy resin available from Adeka, Japan; or YX8000, a low viscous hydrogenated bisphenol A epoxy resin available from Mitsubishi Chemical, Japan.

The amount of epoxy resin (A) in the final composition can vary in wide ranges and is dependent on the use of the composition. In case the composition is used for the preparation of insulation systems for electrical engineering, the amount of epoxy resin (A) is, for example, of from 40 weight percent (wt %) to 98 wt %, based on the total weight of components (A) and (B) in the composition. In one embodiment, the amount of epoxy resin (A) is, for example, of from 70 wt % to 96 wt %, based on the total weight of components (A) and (B). In another embodiment, the amount of the epoxy resin (A) is, for example, of from 50 wt % to 90 wt %, based on the total weight of the components (A) and (B).

The following aliphatic amines or cycloaliphatic amines come into consideration, for example, as the at least one curing agent (B): ethylenediamine; hexamethylenediamine; trimethylhexamethylenediamines; methylpentamethylenediamines; diethylenetriamine; triethylenetetramine; tetraethylenepentamine; N,N-dimethylpropylenediamine-1,3; N,N-diethylpropylenediamine-1,3; 1,2-diaminocyclohexane; 1,4-diaminocyclohexane; bis(4-aminocyclohexyl)methane; bis (3-methyl-4-aminocyclohexyl)methane; bis(3,5-methyl-4-aminocyclohexyl)methane; 2,4-bis(4-aminocyclohexylmethyl)cyclohexylamine; 2,2-bis(4-aminocyclohexyl)propane; 4,4'-bis(4-cyclohexylmethyl) dicyclohexylamine; 2,2-bis(4-amino-3-methylcylohexyl) propane; 3-aminomethyl-3,5,5-trimethylcyclohexylamine (isophorone diamine); 1,4-bis(aminomethyl)cyclohexane; 1,3-bis(aminomethyl)cyclohexane; bicyclo[2.2.1]heptanebis(methylamine) (norbornane diamine); 3,3,5-trimethyl-N-(propan-2-yl)-5-[(propan-2-ylamino)methyl]cyclohexylamine; Jefflink JL 754, a cycloaliphatic amine available from Huntsman Corporation; 4-aminocyclohexyl-4-hydroxycyclohexylmethane and N-aminoethylpiperazine; of which the cycloaliphatic amines are preferred.

Preferred cycloaliphatic amines include 1,2-diaminocyclohexane; bis(4-aminocyclohexyl)methane; bis(3-methyl-4-aminocyclohexyl)methane, 3-aminomethyl-3,5,5-trimethylcyclohexylamine (isophorone diamine); 1,3-bis (aminomethyl)cyclohexane; bicyclo[2.2.1]heptanebis (methylamine) (norbornane diamine); Jefflink JL 754; or N-aminoethylpiperazine.

The aliphatic or cycloaliphatic amines may be used alone, or, alternatively, mixtures of at least two, for example, two, three or four different aliphatic or cycloaliphatic amines may be used.

In a preferred embodiment of the present invention, the at least one curing agent (B) is ethylenediamine; hexamethylenediamine; trimethylhexamethylenediamines; methylpentamethylenediamines; diethylenetriamine; triethylenetetramine; tetraethylenepentamine; N,N-dimethylpropylenediamine-1,3; N,N-diethylpropylenediamine-1,3; 1,2-diaminocyclohexane; 1,4-diaminocyclohexane; bis(4-aminocyclohexyl)methane; bis (3-methyl-4-aminocyclohexyl)methane; bis(3,5-methyl-4-aminocyclohexyl)methane; 2,4-bis(4-aminocyclohexylmethyl)cyclohexylamine; 2,2-bis(4-aminocyclohexyl)propane; 4,4'-bis(4-cyclohexylmethyl) dicyclohexylamine; 2,2-bis(4-amino-3-methylcylohexyl) propane; 3-160 aminomethyl-3,5,5-trimethylcyclohexylamine (isophorone diamine); 1,4-bis (aminomethyl)cyclohexane; 1,3-bis(aminomethyl) cyclohexane; bicyclo[2.2.1]heptanebis(methylamine) (norbornane diamine); 3,3,5-trimethyl-N-(propan-2-yl)-5-[(propan-2-ylamino)methyl]cyclohexylamine; Jefflink JL 754; 4-aminocyclohexyl-4-hydroxycyclohexylmethane; N-aminoethylpiperazine; or dicyandiamide.

In a particularly preferred embodiment of the present invention, the at least one curing agent component (B) is 1,2-diaminocyclohexane, bis(4-aminocyclohexyl)methane, bis(3-methyl-4-aminocyclohexyl)methane, 3-aminomethyl-3,5,5-trimethylcyclohexylamine (isophorone diamine), or dicyandiamide.

The at least one curing agent (B) is either commercially available or can be prepared according to processes known per se. Commercially available products are, for example, DCH99 or ARADUR® 42, cycloaliphatic amine hardeners available from Huntsman Corporation; EC331, a cycloaliphatic amine hardener available from BASF; or Dyhard 100S a dicyandiamide hardener available from AlzChem.

The at least one curing agent (B) may be applied in combination with a polyetheramine. The polyetheramine is, for example, a polyether polyamine, such as a polyether triamine, or a polyether diamine.

Useful polyether diamines include polyoxyalkylene diamines such as polyethylene oxide-polypropylene oxide copolymers that are co-terminated by amine groups. Such polyether diamines may have the formula $H_2N(PO)_x(EO)_y(PO)_zNH_2$, wherein x is a number of from 0 to 10, y is a number of from 0 to 40 and z is a number of from 0 to 10, EO is ethylene oxide and PO is propylene oxide. The polyether polyamines may also be other polyethylene oxide or polypropylene oxide polymers co-terminated by amine groups. Representative polyether diamines using ethylene oxide (EO) and propylene oxide (PO) include the polyether diamines of the following formulae

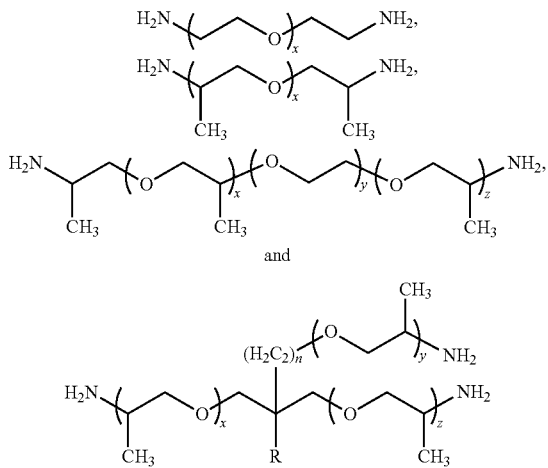

and

Other types of polyether polyamines or ether oligomers may be used. A diamine of polytetrahydrofuran, alone or copolymerized with other alkylene oxide or olefinic monomers, may be used. Any primary polyamine having a hydrocarbon chain with some ether oxygen atoms included may be used. The oxygen atoms may be spaced at regular intervals, so that the polyether polyamine has a single repeating monomer unit, or the oxygen atoms may be spaced at differing intervals, which may be random or distributed according to a repeating pattern. Thus, the polyether polyamine may be a diamine of an ether copolymer, which may be random, block, repeating, or alternating, or of an ether multipolymer having three or more different ether monomer units. The polyether polyamines may have primary or secondary amines.

The oxygen atoms of the polyether component of the polyether polyamine may be replaced, altogether or in part, with other electronegative species such as sulfur. Thus, a polythioether polyamine may be used.

Commercial examples of such polyether polyamines include JEFFAMINE® polyetheramines that are commercially available from Huntsman Corporation. The ether units of these amines are ethylene oxide units, propylene oxide units or mixtures thereof. JEFFAMINE®polyetheramines typically have oxypropylene units or mixtures of oxyethylene and oxypropylene units. Preferred JEFFAMINE® polyetheramines are JEFFAMINE® D-, JEFFAMINE® ED-, JEFFAMINE® T-, and JEFFAMINE® XTJ-series polyetheramines.

The amount of curing agent (B) in the final composition can vary in wide ranges and is dependent on the use of the composition. In case the composition is used for the preparation of insulation systems for electrical engineering, the amount of curing agent (B) in the final composition is, for example, of from 2 weight percent (wt %) to 60 wt %, based on the total weight of components (A) and (B) in the composition. In one embodiment, the amount of curing agent (B) is, for example, of from 4 wt % to 40 wt %, based on the total weight of components (A) and (B). In another embodiment, the amount of curing agent (B) is, for example, of from 10 wt % to 50 wt %, based on the total weight of the components (A) and (B).

The at least one silanized filler (C) is either commercially available or can be prepared according to processes known per se, for example, by silanization of suitable fillers with epoxy silane or amino silane. Suitable fillers are, for example, metal powder, wood flour, glass powder, glass beads, semi-metal oxides, metal oxides, metal hydroxides, semi-metal and metal nitrides, semi-metal and metal carbides, metal carbonates, metal sulfates, and natural or synthetic minerals. The filler material is appropriately coated with a silane known in the art for coating of filler materials, either before the filler is added to the epoxy resin composition, or, alternatively, by adding the filler and the silane to the epoxy resin composition, upon which the silanized filler is formed in the composition.

A suitable filler is selected, for example, from the group quartz sand, quartz powder, silica, aluminium oxide, titanium oxide, zirconium oxide, $Mg(OH)_2$, $Al(OH)_3$, dolomite [$CaMg(CO_3)_2$], $Al(OH)_3$, $AlO(OH)$, silicon nitride, boron nitrides, aluminium nitride, silicon carbide, boron carbides, dolomite, chalk, calcium carbonate, barite, gypsum, hydromagnesite, zeolites, talcum, mica, kaolin and wollastonite. Preferred is quarz, silica, wollastonite or calcium carbonate, especially quarz or silica. Suitable silica is, for example, crystalline or amorphous silica, especially fused silica.

The amount of silanized filler (C) in the final composition can vary in wide ranges and is dependent on the use of the composition. In case the composition is used for the preparation of insulation systems for electrical engineering, the amount of silanized filler (C) is, for example, of from 30 weight percent (wt %) to 75 wt %, based on the total weight of the thermosetting epoxy resin composition. In one embodiment, the amount of silanized filler (C) is, for example, of from 40 wt % to 75 wt %, based on the total weight of the thermosetting epoxy resin composition. In another embodiment, the amount of silanized filler (C) is, for example, of from 50 wt % to 70 wt %, based on the total weight of the thermosetting epoxy resin composition. In still another embodiment, the amount of silanized filler (C) is, for example, of from 60 wt % to 70 wt %, based on the total weight of the thermosetting epoxy resin composition.

Further additives may be selected from processing aids to improve the rheological properties of the liquid mix resin, hydrophobic compounds including silicones, wetting/dispersing agents, plasticizers, reactive or non-reactive diluents, flexibilizers, accelerators, antioxidants, light absorbers, pigments, flame retardants, fibers and other additives generally used in electrical applications. These additives are known to the person skilled in the art.

In one embodiment the multiple component thermosetting epoxy resin composition comprises (A) at least one epoxy resin selected from the group diglycidylether of 1,4-bis(hydroxymethyl)cyclohexane and diglycidylether of hydrogenated bisphenol A, (B) at least one curing agent selected from the group 1,2-diaminocyclohexane, bis(4-aminocyclohexyl)methane, bis(3-methyl-4-aminocyclohexyl)methane, 3-aminomethyl-3,5,5-trimethylcyclohexylamine (isophorone diamine) and dicyandiamide, and (C) at least one silanized filler selected from the group quarz, silica, wollastonite and calcium carbonate.

In another embodiment the multiple component thermosetting epoxy resin composition comprises
(A) a diglycidylether of hydrogenated bisphenol A,
(B) 3-aminomethyl-3,5,5-trimethylcyclohexylamine (isophorone diamine), and
(C) silanized quarz sand or powder.

In case the composition is used for the preparation of outdoor articles other than insulation systems for electrical engineering, for example, the preparation of composite articles or coatings for air core reactors, silanized filler (C) may be omitted. Some of the compositions comprising no silanized filler (C) are still novel.

Accordingly, the present invention also relates to a multiple component thermosetting epoxy resin composition comprising
(A) at least one cycloaliphatic glycidyl-type epoxy resin without an ester group, and
(B) dicyandiamide as the curing agent,
wherein the definitions, embodiments and preferences given above apply.

The epoxy resin composition according to the present invention are R42-free and SVHC-free, and distinguished by a low water pick-up, a very good water diffusion break down strength and a long pot life.

The epoxy resin composition according to the present invention can advantageously be used for the manufacturing of insulation systems for electrical engineering, in particular, insulation systems exposed to outdoor environment, for example, outdoor insulators and bushings, outdoor instrument transformers and distribution transformers, outdoor switch gears, reclosers, load break switches and locomotive insulators.

The inventive compositions can also be used for the manufacturing of other articles exposed to outdoor environment, for example, composite articles, such as water pipes and water containers, or coatings for air core reactors.

The glass transition temperature of the articles prepared from the epoxy resin composition according to the present invention can be adjusted as desired, for example, in the range of from 70° C. to 150° C.

Generally, insulation systems are prepared by casting, potting, encapsulation, and impregnation processes such as gravity casting, vacuum casting, automatic pressure gelation (APG), vacuum pressure gelation (VPG), infusion, and the like.

A typical process for making insulation systems for electrical engineering, such as cast resin epoxy insulators, is automatic pressure gelation (APG). APG allows for the preparation of a casting product made of an epoxy resin in a short period of time by hardening and forming the epoxy resin. In general, an APG apparatus to carry out the APG process includes a pair of molds (hereafter called mold), a resin mixing and degassing tank connected to the mold through a pipe, and an opening and closing system for opening and closing the mold.

Before injection of the curable epoxy resin composition into the hot mold, the components of the curable composition comprising the epoxy resin and the curing agent have to be prepared for injection.

In case of a pre-filled system, i.e. a system comprising components which already contain the filler, it is required to stir the components in the supply tank while heating to prevent sedimentation and obtain a homogeneous formulation. After homogenization, the components are combined and transferred into a mixer and mixed at elevated temperature and reduced pressure to degas the formulation. The degassed mixture is subsequently injected into the hot mold.

In case of a non-pre-filled system, the epoxy resin component and the curing agent component are typically mixed individually with the filler at elevated temperature and reduced pressure to prepare the pre-mixture of the resin and the curing agent. Optionally, further additives may be added beforehand. In a further step, the two components are combined to form the final reactive mixture, typically by mixing at elevated temperature and reduced pressure. Subsequently, the degassed mixture is injected into the mold.

In a typical APG process, a metal conductor or an insert, which is pre-heated and dried, is placed into the mold located in a vacuum chamber. After closing of the mold by an opening and closing system, the epoxy resin composition is injected into the mold from an inlet located at the bottom of the mold by applying pressure to the resin mixing tank. Before injection, the resin composition is normally held at a moderate temperature of 40 to 60° C. to ensure an appropriate pot life (usable time of the epoxy resin), while the temperature of the mold is kept at around 120° C. or above to obtain the casting products within a reasonably short time. After injection of the epoxy resin composition into the hot mold, the resin composition cures while the pressure applied to the epoxy resin in the resin mixing tank is kept at about 0.1 to 0.5 MPa.

Large casting products made of more than 10 kg of resin may be produced conveniently by the APG process within a short time, for example, of from 20 to 60 minutes. Normally, the casting product released from the mold is post cured in a separate curing oven to complete the reaction of the epoxy resin.

The present invention also relates to a process for the preparation of outdoor articles, wherein a multiple component thermosetting resin composition is used, said resin composition comprising
(A) at least one cycloaliphatic glycidyl-type epoxy resin without an ester group,
(B) at least one curing agent selected from the group aliphatic amine, cycloaliphatic amine, and dicyandiamide, and
(C) at least one silanized filler,
wherein the definitions, embodiments and preferences given above apply.

In one embodiment of the inventive process, the said outdoor articles are insulation systems for electrical engineering, in particular, insulation systems prepared by casting, potting, encapsulation, and impregnation processes such as gravity casting, vacuum casting, automatic pressure gelation (APG), vacuum pressure gelation (VPG), filament winding, pultrusion and infusion. Preferred are automatic pressure gelation (APG) and vacuum casting, especially automatic pressure gelation (APG).

In another embodiment of the inventive process, the outdoor articles are composite articles, such as water pipes and water containers, or coatings for air core reactors.

Preparation of insulation systems for electrical engineering is often carried out by Automatic Pressure Gelation (APG) or Vacuum Casting. When using known epoxy resin compositions based on anhydride cure, such processes typically include a curing step in the mold for a time sufficient to shape the epoxy resin composition into its final infusible three dimensional structures, typically up to ten hours, and a post-curing step of the demolded article at elevated temperature to develop the ultimate physical and mechanical properties of the cured epoxy resin composition. Such a post-curing step may take, depending on the shape and size of the article, up to thirty hours.

The cure profile and shrinkage can advantageously be controlled in the desired manner, when carrying out the inventive process. Compared to the known epoxy resin compositions based on anhydride cure, shorter curing times and lower mold and curing temperatures can be applied. Moreover, the post-cure time can be shortened and the post-cure temperature lowered, all of which safes process time and energy. A post-cure treatment may even be omitted. The pot life of the thermosetting epoxy resin composition is sufficient to use common application techniques known in the art. Compared to the epoxy resin compositions known in the art, the thermosetting epoxy resin composition according to the present invention is distinguished by low odor emission, because respiratory sensitizing anhydrides are omitted. A lower exothermic peak temperature to control the cure profile, i.e. gelation front within the mold, is provided by the process according to the present invention, which is similar to processes carried out with known epoxy resin compositions based on anhydride cure.

The process according to the present invention is, in particular, useful for the preparation of encased articles exhibiting good mechanical, electrical and dielectrical properties.

Accordingly, the present invention refers to an insulation system article obtained by the process according to the present invention. The glass transition temperature of the article is in the same range as for known high temperature cure anhydride based thermosetting epoxy resin compositions. The tensile strength of the article is 70 MPa or higher.

Possible uses of the insulation system articles prepared according to the present invention are, for example, base insulators in the medium-voltage sector, in the production of insulators associated with outdoor power switches, measuring transducers, bushings, and overvoltage protectors, in switchgear constructions, in power switches, and electrical machines, as coating materials for transistors and other semiconductor elements and/or to impregnate electrical installations.

In particular the articles prepared in accordance with the inventive process are used for medium and high voltage switchgear applications and instrument transformers (6 kV to 143 kV).

The following Examples serve to illustrate the invention. Unless otherwise indicated, the temperatures are given in degrees Celsius, parts are parts by weight and percentages relate to % by weight. Parts by weight relate to parts by volume in a ratio of kilograms to litres.
Description of Ingredients:
CY184: low viscous cycloaliphatic epoxy resin with an epoxy equivalent of 5.8 to 6.1 Eq/kg. Supplier: Huntsman, Switzerland.
EP4080E: low viscous hydrogenated bisphenol A epoxy resin with an epoxy equivalent of 4.3 to 5 Eq/kg. Supplier: ADEKA, Japan.
YX8000: low viscous hydrogenated bisphenol A epoxy resin with an epoxy equivalent of 4.5 to 5.2 Eq/kg. Supplier: Mitsubishi Chemical, Japan.
DY-C: 1,4-bis(hydroxymethyl)cyclohexane diglycidylether, low viscous epoxy resin. Supplier: Huntsman, Switzerland.
HY1235 BD: liquid, modified cycloaliphatic anhydride hardener. Supplier: Huntsman, Germany
DY062: liquid, tertiary amine, catalyst. Supplier: Huntsman, China.
EC331: bis(3-methyl-4-aminocyclohexyl)methane, amine hardener. Supplier: BASF, China.
DCH99: 1,2-diaminocyclohexane, amine hardener. Supplier: Huntsman, China.
Aradur 42: Isophorone diamine, amine hardener. Supplier: Huntsman, China.
W12EST: silica treated with epoxysilane, filler. Supplier: Quarzwerke, Germany.
W12AST: silica treated with aminosilane, filler. Supplier: Quarzwerke, Germany.
Dyhard 100S: dicyandiamide, amine hardener. Supplier: AlzChem, China.

Comparative Example 1

CY184 is preheated at 60° C. in an oven for 0.5 h. 100 g of preheated CY184 are added to 90 g of HY1235BD in a steel vessel under stirring for about 5 minutes. Stirring is discontinued, 0.6 g of DY062 are added to the mixture, and stirring is continued for about 2 minutes. Stirring is discontinued again, and the composition in the vessel is degassed carefully by applying a vacuum for about 1 minute. A small part of the mixture is used to measure the Gel time at 60° C. with a Gelnorm. The main part of the mixture is poured into a hot aluminium mold, preheated to 80° C. and treated with a mold release agent QZ13, to prepare specimens of 4 mm thickness for water pick-up testing. The composition in the mold is cured in an oven at 80° C. for 6 h, and at 140° C. for another 10 h. After curing, the specimens are removed from the mold and allowed to cool to ambient temperature.

Comparative Example 2

CY184 is preheated at 80° C. in an oven for 0.5 h. 200 g of preheated CY184 are added to 180 g of HY1235BD in a steel vessel under stirring for about 5 minutes. Then, 740 g of W12EST are added to the stirred mixture in portions within 20 minutes. Subsequently, the composition in the vessel is preheated in an oven at 80° C. for 0.5 h, the vessel is removed from the oven, 1.2 g of DY062 are added, and stirring is continued for about 5 minutes. Stirring is discontinued and the composition in the vessel is degassed carefully by applying a vacuum for about 2 to 3 minutes. The composition is poured into a hot aluminium mold, preheated to 80° C., and treated with a mold release agent QZ13 to prepare specimens of 4 mm, 6 mm and 10 mm thickness for testing. The composition in the mold is degassed carefully by applying a vacuum for about 1 to 2 minutes, and cured in an oven at 80° C. for 6 h, and at 140° C. for another 10 h. After curing, the specimens are removed from the mold and allowed to cool to ambient temperature.

Comparative Example 3

CY184 is preheated at 60° C. in an oven for 0.5 h. 100 g of preheated CY184 are added to 36 g of EC331 g in a steel vessel under stirring for about 3 minutes. Stirring is discontinued, and the composition in the vessel is degassed carefully by applying a vacuum for about 0.5 minutes. A small part of the mixture is used to measure the Gel time at 60° C. with a Gelnorm. The main part of the mixture is poured into a hot aluminium mold, preheated to 60° C. and treated with a mold release agent QZ13, to prepare specimens of 4 mm thickness for water pick-up testing. The composition in the mold is cured in an oven at 60° C. for 6 h, and at 140° C. for another 10 h. After curing, the specimens are removed from the mold and allowed to cool to ambient temperature.

Comparative Example 4

CY184 and W12EST are preheated at 60° C. in an oven for 0.5 h. 200 g of preheated CY184 are fed into a steel vessel, and 528 g of W12EST are added in portions under stirring within 20 minutes. Subsequently, the composition in the vessel is heated in an oven at 60° C. for 0.5 h, the vessel is removed from the oven, and the composition is degassed carefully by applying a vacuum for about 15 minutes. The composition in the vessel is again heated in an oven for another 15 minutes at 60° C. and removed from the oven. 72 g of EC331 are added to the composition and the composition is stirred for about 3 minutes. Stirring is discontinued and the composition in the vessel is degassed carefully by applying a vacuum for about 1 minute. The composition is poured into a hot aluminium mold, preheated to 60° C., and treated with a mold release agent QZ13 to prepare specimens of 4 mm, 6 mm and 10 mm thickness for testing. Then, the composition in the mold is degassed carefully by applying a vacuum for about 1 minute, and cured in an oven at 60° C. for 6 h, and at 140° C. for another 10 h. Subsequently, the specimens are removed from the mold and allowed to cool to ambient temperature.

Comparative Example 5

Comparative Example 3 is repeated, but EC331 is replaced by an equivalent amount of DCH99.

Comparative Example 6

Comparative Example 4 is repeated, but EC331 is replaced by an equivalent amount of DCH99.

Comparative Example 7

Comparative Example 3 is repeated, but EC331 is replaced by an equivalent amount of isophorone diamine.

Comparative Example 8

Comparative Example 4 is repeated, but EC331 is replaced by an equivalent amount of isophorone diamine.

Comparative Example 9

1000 g of CY184, 30 g of Dyhard 100s and 3 g of DY 062 are placed into a 3 l chamber of a vacuum disperser & mixer, and the chamber is heated to 60° C. Mixing/dispensing is conducted at a mixer speed of 200 rpm and a disperser speed 1 of 1500 rpm for 2 h under vacuum until a homogeneous composition is obtained. Subsequently, 2000 g of preheated dry filler W12EST are added to the composition. Mixing/dispensing is continued under the same conditions for 1 h until a homogeneous composition is obtained. Then, the composition is injected under pressure into a metal plate mold preheated to 80° C. to prepare specimens of varying thickness of 4 mm, 6 mm and 10 mm. The filled mold is put into oven for precuring of the composition at 120° C. for 3 h and postcuring at 160° C. for 10 h. After curing, the specimens are removed from the mold and allowed to cool to ambient temperature.

Comparative Example 10

YX8000 is preheated at 60° C. in an oven for 0.5 h. 100 g of preheated YX8000 are added to 30 g of EC331 in a steel vessel under stirring for about 3 minutes. Stirring is discontinued, and the composition in the vessel is degassed carefully by applying a vacuum for about 0.5 minutes. A small part of the mixture is used to measure the Gel time at 60° C. with a Gelnorm. The main part of the mixture is poured into a hot aluminium mold, preheated to 60° C. and treated with a mold release agent QZ13, to prepare specimens of 4 mm thickness for water pick-up testing. The composition in the mold is cured in an oven at 60° C. for 6 h, and at 160° C. for another 10 h. After curing, the specimens are removed from the mold and allowed to cool to ambient temperature.

Example 1

YX8000 and W12EST are preheated at 60° C. in an oven for 0.5 h. 200 g of preheated YX8000 are feeded into a steel vessel, and 504.7 g of W12EST are added in portions under stirring within 20 minutes. Subsequently, the composition in the vessel is heated in an oven at 60° C. for 0.5 h, the vessel is removed from the oven, and the composition is degassed carefully by applying a vacuum for about 15 minutes. The composition in the vessel is again heated in an oven for another 15 minutes at 60° C. and, then, removed from the oven. 60 g of EC331 are added to the composition, and the composition is stirred for about 3 minutes. Stirring is discontinued and the composition in the vessel is degassed again carefully by applying a vacuum for about 1 to 2 minutes. The composition is poured into a hot aluminium mold, preheated to 60° C., and treated with a mold release agent QZ13 to prepare specimens of 4 mm, 6 mm and 10 mm thickness for testing. Then, the composition in the mold is degassed carefully by applying a vacuum for about 1 minute, and cured in an oven at 60° C. for 6 h, and at 160° C. for another 10 h. Subsequently, the specimens are removed from the mold and allowed to cool to ambient temperature.

Example 2

1000 g of YX8000, 50 g of Dyhard 100s and 3 g of DY 062 are placed into a 3 l chamber of a vacuum disperser & mixer, and the chamber is heated to 60° C. Mixing/dispensing is conducted at a mixer speed of 200 rpm and a disperser speed 1 of 1500 rpm for 2 h under vacuum until a homogeneous composition is obtained. Subsequently, 2050 g of preheated dry filler W12EST are added to the composition. Mixing/dispensing is continued under the same conditions for 1 h until a homogeneous composition is obtained. Then, the composition is injected under pressure into a metal plate mold preheated to 80° C. to prepare specimens of varying thickness of 4 mm, 6 mm and 10 mm. The filled mold is put into oven for precuring of the composition at 120° C. for 3 h and postcuring at 160° C. for 10 h. After curing, the specimens are removed from the mold and allowed to cool to ambient temperature.

Comparative Example 11

EP4080E is preheated at 60° C. in an oven for 0.5 h. 100 g of preheated EP4080E are added to 14 g of DCH99 in a steel vessel under stirring for about 3 minutes. Stirring is discontinued, and the composition in the vessel is degassed carefully by applying a vacuum for about 0.5 minutes. A small part of the mixture is used to measure the Gel time at 60° C. with a Gelnorm. The main part of the mixture is poured into a hot aluminium mold, preheated to 60° C. and treated with a mold release agent QZ13, to prepare specimens of 4 mm thickness for water pick-up testing. The composition in the mold is cured in an oven at 60° C. for 6 h, and at 160° C. for another 10 h. After curing, the specimens are removed from the mold and allowed to cool to ambient temperature.

Example 3

EP4080E and W12EST are preheated at 60° C. in an oven for 0.5 h. 200 g of preheated EP4080E are feeded into a steel vessel, and 442.6 g of W12EST are added in portions under stirring within 20 minutes. Subsequently, the composition in the vessel is heated in an oven at 60° C. for 0.5 h, the vessel is removed from the oven, and the composition is degassed carefully by applying a vacuum for about 15 minutes. The composition in the vessel is again heated in an oven for another 15 minutes at 60° C. and, then, removed from the oven. 28 g of DCH99 are added to the composition, and the composition is stirred for about 3 minutes. Stirring is discontinued and the composition in the vessel is degassed again carefully by applying a vacuum for about 1 to 2 minutes. The composition is poured into a hot aluminium mold, preheated to 60° C., and treated with a mold release agent QZ13 to prepare specimens of 4 mm, 6 mm and 10 mm thickness for testing. Then, the composition in the mold is degassed carefully by applying a vacuum for about 1 minute, and cured in an oven at 60° C. for 6 h, and at 160° C. for another 10 h. Subsequently, the specimens are removed from the mold and allowed to cool to ambient temperature.

Comparative Example 12

EP4080E is preheated at 60° C. in an oven for 0.5 h. 100 g of preheated EP4080E are added to 20.5 g of Aradur 42 in a steel vessel under stirring for about 3 minutes. Stirring is discontinued, and the composition in the vessel is degassed carefully by applying a vacuum for about 0.5 minutes. A small part of the mixture is used to measure the Gel time at 60° C. with a Gelnorm. The main part of the mixture is poured into a hot aluminium mold, preheated to 60° C. and treated with a mold release agent QZ13, to prepare specimens of 4 mm thickness for water pick-up testing. The composition in the mold is cured in an oven at 60° C. for 6 h, and at 160° C. for another 10 h. After curing, the specimens are removed from the mold and allowed to cool to ambient temperature.

Example 4

EP4080E and W12EST are preheated at 60° C. in an oven for 0.5 h. 200 g of preheated EP4080E are feeded into a steel vessel, and 467.8 g of W12EST are added in portions under stirring within 20 minutes. Subsequently, the composition in the vessel is heated in an oven at 60° C. for 0.5 h, the vessel is removed from the oven, and the composition is degassed carefully by applying a vacuum for about 15 minutes. The composition in the vessel is again heated in an oven for another 15 minutes at 60° C. and, then, removed from the oven. 41 g of Aradur 42 are added to the composition, and the composition is stirred for about 3 minutes. Stirring is discontinued and the composition in the vessel is degassed again carefully by applying a vacuum for about 1 to 2 minutes. The composition is poured into a hot aluminium mold, preheated to 60° C., and treated with a mold release agent QZ13 to prepare specimens of 4 mm, 6 mm and 10 mm thickness for testing. Then, the composition in the mold is degassed carefully by applying a vacuum for about 1 minute, and cured in an oven at 60° C. for 6 h, and at 160° C. for another 10 h. Subsequently, the specimens are removed from the mold and allowed to cool to ambient temperature.

Comparative Example 13

DY-C is preheated at 60° C. in an oven for 0.5 h. 100 g of preheated DY-C are added to 37.5 g of EC331 in a steel vessel under stirring for about 3 minutes. Stirring is discontinued, and the composition in the vessel is degassed carefully by applying a vacuum for about 0.5 minutes. A small part of the mixture is used to measure the Gel time at 60° C. with a Gelnorm. The main part of the mixture is poured into a hot aluminium mold, preheated to 60° C. and treated with a mold release agent QZ13, to prepare specimens of 4 mm thickness for water pick-up testing. The composition in the mold is cured in an oven at 60° C. for 6 h, and at 160° C. for another 10 h. After curing, the specimens are removed from the mold and allowed to cool to ambient temperature.

Example 5

DY-C and W12EST are preheated at 60° C. in an oven for 0.5 h. 200 g of preheated DY-C are feeded into a steel vessel, and 533.8 g of W12EST are added in portions under stirring within 20 minutes. Subsequently, the composition in the vessel is heated in an oven at 60° C. for 0.5 h, the vessel is removed from the oven, and the composition is degassed carefully by applying a vacuum for about 15 minutes. The composition in the vessel is again heated in an oven for another 15 minutes at 60° C. and, then, removed from the oven. 75 g of EC331 are added to the composition, and the composition is stirred for about 3 minutes. Stirring is discontinued and the composition in the vessel is degassed again carefully by applying a vacuum for about 1 to 2 minutes. The composition is poured into a hot aluminium mold, preheated to 60° C., and treated with a mold release agent QZ13 to prepare specimens of 4 mm, 6 mm and 10 mm thickness for testing. Then, the composition in the mold is degassed carefully by applying a vacuum for about 1 minute, and cured in an oven at 60° C. for 6 h, and at 160° C. for another 10 h. Subsequently, the specimens are removed from the mold and allowed to cool to ambient temperature.

Example 6

1000 g of YX8000, 50 g of Dyhard 100s and 3 g of DY 062 are placed into a 3 l chamber of a vacuum disperser mixer, and the chamber is heated to 60° C. Mixing/dispensing is conducted at a mixer speed of 200 rpm and a disperser speed of 1500 rpm for 2 h under vacuum until a homogeneous composition is obtained. Then, the composition is injected under pressure into a metal plate mold preheated to 80° C. to prepare specimens of varying thickness of 4 mm, 6 mm and 10 mm. The filled mold is put into oven for precuring of the composition at 120° C. for 3 h and post-curing at 160° C. for 10 h. After curing, the specimens are removed from the mold and allowed to cool to ambient temperature.

TABLE 1

Test data

| | Comp Ex 2 | Comp Ex 4 | Comp Ex 6 | Comp Ex 8 | Comp Ex 9 | Ex 1 | Ex 2 | Ex 3 | Ex 4 | Ex 5 |
|---|---|---|---|---|---|---|---|---|---|---|
| Pot life | good | short | short | short | good | good | good | good | good | good |
| Tensile strength[1] [MPa] | 98.9 | 79.7 | 72.0 | | | 72.3 | 72.5 | | | |
| Elongation at break[2] [%] | 1.19 | 0.87 | 0.63 | | | 1.62 | 1.73 | | | |
| G1C[3] [J/m$^2$] | 560 | 578 | 443 | | | 488 | | | | |
| CTE[4] | 32.9 | 33.7 | 31.1 | | | 40.7 | 33.6 | | | |
| Tg[5] [° C.] | 111 | 111 | 114 | 116 | 97 | 140 | 117 | 130 | 120 | 79 |
| Gel time at 60° C.[6] [min] | 494 | 61 | 27 | 23 | | 160 | >6 h | 100 | 85 | 140 |
| Water pick up after 2 days[7] [%] | 1.38 | 6.46 | 19.93 | 10.23 | | 1.49 | 1.37 | 1.93 | 2.11 | 3.43 |
| Water diffusion test[8] | P at 12 kV | F at 12 kV | F at 12 kV | F at 12 kV | F at 12 kV | P at 12 kV | P at 12 kV | P at 12 kV | P at 12 kV | P at 12 kV |

[1]ISO 527
[2]ISO 527
[3]Huntsman proprietary test method
[4]ISO 11359-2
[5]IE 1006; Differential Scanning Calorimetry on a Mettler SC 822e (range: 20 to 250° C. at 10° C. min−1)
[6]Gel norm method; specimens without filler
[7]ISO 62; boiling in water; specimens without filler
[8]IEC 62217; boiling for 100 h
P = test passed;
F = test failed Comparative Example 2 is based on anhydride curing, and represents the state of the art composition in use for casting, potting and encapsulation since more than 40 years. It performs well in all aspects, except that the anhydride used is R 42 labelled (may cause sensitization by inhalation) and SVHC listed.

Comparative Examples 4, 6, 8 and 9 are based on an epoxy resin comprising carboxylic ester groups. A high water pick up is observed for these compositions, and they fail as to water diffusion break down strength. Also an inacceptable pot life is observed for the compositions of Comparative Examples 4, 6 and 8.

The inventive compositions of Examples 1 to 5 exhibit a long pot life, a low water pick up, and pass the water diffusion test. The mechanical performance is comparable to state of the art systems currently in use.

TABLE 2

Test data

| | Comp Ex 9 | Ex 6 |
|---|---|---|
| Tg[1] [° C.] | 97 | 126 |
| Gel time at 80° C./140° C.[2] [min] | | 390/12.5 |
| Water pick up after 2 days[3] [%] | crack formation[4] | 3.90 |

[1]IE 1006; Differential Scanning Calorimetry on a Mettler SC 822e (range: 20 to 250° C. at 10° C. min−1)
[2]Gel norm method; specimens without filler
[3]ISO 62; boiling in water; specimens without filler
[4]filled specimen exhibits severe crack formation, due to high water pick up The inventive composition of Example 6 exhibits a low water pick up.

What is claimed is:

1. A multiple component thermosetting epoxy resin composition comprising:
   (A) at least one cycloaliphatic glycidyl-type epoxy resin without an ester group, and containing more than one vicinal epoxy group,
   (B)) 2 wt% to 17 wt% of at least one curing agent selected from the group consisting of a cycloaliphatic amine, and dicyandiamide, where the wt% is based on the total weight of (A) and (B) and
   (C) from 60 wt% to 70 wt% of at least one silanized filler, wherein the wt% is based on the total weight of the epoxy resin composition and
   wherein the composition is free of anhydrides.

2. The composition according to claim 1, wherein the at least one epoxy resin (A) is a polyglycidylether of 1,2-cyclohexanediol, 1,3-cyclohexanediol, 1,4-cyclohexanediol (quinitol), 1,4-bis(hydroxymethyl)cyclohexane, 1,1-bis(hydroxymethyl)cyclohex-3-ene, bis(4-hydroxycyclohexyl) methane (hydrogenated bisphenol F), 2,2-bis(4-hydroxycyclohexyl)propane (hydrogenated bisphenol A), 2,2-bis(3-methyl-4-hydroxycyclohexyl)propane (hydrogenated bisphenol C), 1,1-bis(4-hydroxycyclohexyl)ethane (hydrogenated bisphenol E), 1,3-cyclopentanediol, 4,4'-dihydroxydicyclohexane, 2,6-bis(4'-hydroxycyclohexylmethyl)-1-hydroxycyclohexane, 1,3,5-trihydroxycyclohexane, 1,2,2-tris (4-hydroxycyclohexyl)ethane, or hydrogenated phenol-formaldehyde condensation products having 3 to 10 cyclohexane rings.

3. The composition according to claim 1, wherein the said at least one epoxy resin (A) is a diglycidylether of 1,4-bis (hydroxymethyl)cyclohexane or hydrogenated bisphenol A.

4. The composition according to claim 1, wherein the at least one curing agent (B) is 1,2-diaminocyclohexane; 1,4- diaminocyclohexane; bis(4-aminocyclohexyl)methane; bis (3-methyl-4-aminocyclohexyl)methane; bis(3,5-methyl-4-aminocyclohexyl)methane; 2,4-bis(4-aminocyclohexylmethyl)cyclohexylamine; 2,2-bis(4-aminocyclohexyl)propane; 4,4'-bis(4-cyclohexylmethyl) dicyclohexylamine; 2,2-bis(4-amino-3-methylcylohexyl) propane; 3-aminomethyl-3,5,5-trimethylcyclohexylamine (isophorone diamine); 1,4-bis(aminomethyl)cyclohexane; 1,3-bis(aminomethyl)cyclohexane; bicyclo[2.2.1]heptanebis(methylamine) (norbornane diamine); 3,3,5-trimethyl-N-(propan-2-yl)-5-[(propan-2-ylamino)methyl]cyclohexylamine; (methylethyl) (3,5,5-trimethyl-3-{[(methylethyl)amino]methyl}cyclohexyl)amine; 4-aminocyclohexyl-4-hydroxycyclohexylmethane; N-aminoethylpiperazine; or dicyandiamide.

5. The composition according to claim 1, wherein the at least one curing agent (B) is 1,2-diaminocyclohexane, bis (4-aminocyclohexyl)methane, bis(3-methyl-4-aminocyclohexyl)methane, 3-aminomethyl-3,5,5-trimethylcyclohexylamine (isophorone diamine), or dicyandiamide.

6. The composition according to claim 1, wherein the at least one silanized filler is obtained by silanization of quartz sand, quartz powder, silica, aluminium oxide, titanium oxide, zirconium oxide, $Mg(OH)_2$, $Al(OH)_3$, dolomite $[CaMg(CO_3)_2]$, $Al(OH)_3$, AlO(OH), silicon nitride, boron nitrides, aluminium nitride, silicon carbide, boron carbides, dolomite, chalk, calcium carbonate, barite, gypsum, hydromagnesite, zeolites, talcum, mica, kaolin or wollastonite.

7. The composition according to claim 1, wherein the said at least one silanized filler is obtained by silanization of quarz, silica, wollastonite or calcium carbonate.

8. The composition according to claim 1, wherein the
(A) at least one epoxy resin is selected from the group consisting of diglycidylether of 1,4-bis(hydroxymethyl)cyclohexane and diglycidylether of hydrogenated bisphenol A,
(B) at least one curing agent is selected from the group consisting of 1,2-diaminocyclohexane, bis(4-aminocyclohexyl)methane, bis(3-methyl-4-aminocyclohexyl) methane, 3-aminomethyl-3,5,5-trimethylcyclohexylamine (isophorone diamine) and dicyandiamide, and
(C) at least one silanized filler is selected from the group consisting of quartz, silica, wollastonite and calcium carbonate.

9. A multiple component thermosetting epoxy resin composition comprising
(A) at least one cycloaliphatic glycidyl-type epoxy resin without an ester group and containing more than one vicinal epoxy group,
(B) 2 wt% to 4.8 wt% dicyandiamide as a curing agent, where the wt% is based on the total weight of (A) and (B) and
(C) from 60 wt% to 70 wt% of at least one filler silanized with an epoxy silane or an amino silane, wherein the wt% is based on the total weight of the epoxy resin composition and wherein the resin composition is free of anhydrides.

10. An outdoor article comprising a multiple component thermosetting resin composition, said resin composition comprising
(A) at least one cycloaliphatic glycidyl-type epoxy resin without an ester group and containing more than one vicinal epoxy group,
(B) 2 wt% to 17 wt % of at least one curing agent selected from the group consisting of a cycloaliphatic amine, and dicyandiamide, where the wt % is based on the total weight of (A) and (B) and
(C) from 60 wt% to 70 wt% of at least one silanized filler, wherein the wt% is based on the total weight of the epoxy resin composition and
wherein the resin composition is free of anhydrides.

11. The outdoor article of claim 10, wherein the outdoor article is an insulation system for electrical engineering prepared by casting, potting, encapsulation, or an impregnation system.

12. The outdoor article of claim 11, wherein the insulation system for electrical engineering is prepared by automatic pressure gelation (APG)m or vacuum casting.

13. The outdoor article of claim 10, wherein the outdoor article is a composite article, or the coating of an air core reactor.

* * * * *